(12) United States Patent
Terao et al.

(10) Patent No.: US 6,567,916 B1
(45) Date of Patent: May 20, 2003

(54) METHOD AND DEVICE FOR AUTHENTICATION

(75) Inventors: Taro Terao, Nakai-machi (JP); Rumiko Kakehi, Nakai-machi (JP); Masaki Kyojima, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/240,876

(22) Filed: Feb. 1, 1999

(30) Foreign Application Priority Data

Feb. 12, 1998 (JP) .......................................... 10-029552

(51) Int. Cl.$^7$ ............................... H04L 9/00; H04L 9/28

(52) U.S. Cl. ....................... 713/176; 713/168; 713/175; 380/42; 380/28; 705/57

(58) Field of Search ................................. 713/168–175, 713/176; 380/28, 52, 42; 708/620; 705/50, 57

(56) References Cited

U.S. PATENT DOCUMENTS

| | | | | | |
|---|---|---|---|---|---|
| 4,908,861 | A | * | 3/1990 | Brachtl et al. | 713/187 |
| 5,218,637 | A | * | 6/1993 | Angebaud et al. | 713/173 |
| 5,606,617 | A | * | 2/1997 | Brands | 380/30 |
| 5,625,695 | A | * | 4/1997 | M'Raihi et al. | 380/28 |
| 5,761,306 | A | * | 6/1998 | Lewis | 380/282 |
| 5,870,470 | A | * | 2/1999 | Johnson et al. | 380/285 |
| 5,910,989 | A | * | 6/1999 | Naccache | 713/173 |
| 6,005,942 | A | * | 12/1999 | Chan et al. | 713/187 |
| 6,047,242 | A | * | 4/2000 | Benson | 702/35 |
| 6,052,469 | A | * | 4/2000 | Johnson et al. | 380/286 |
| 6,076,163 | A | * | 6/2000 | Hoffstein et al. | 713/168 |
| 6,148,084 | A | * | 11/2000 | Brands | 380/279 |
| 6,275,936 | B1 | * | 8/2001 | Kyojima et al. | 713/182 |

OTHER PUBLICATIONS

Menezes, Hand book of applied cryptography.1997, CRC press LLC,, pp. 412–414 and 450–451.*
Schneier, Applied cryptography 1996, Katherine Schowalter, second edition, pp. 450–451 and 508–510.*
L. C. Guillou et al., *A Practical Zero–Knowledge Protocol Fitted To Security Microprocessor Minimizing Both Transmission And Memory*, pp. 123–128, date unknown.
A. Fiat et al., *How To Prove Yourself: Practical Solutions to Identification and Signature Problems*, pp. 186–194, date unknown.
L. C. Guillou et al., *A "Paradoxical" Indentity–Based Signature Scheme Resulting from Zero–Knowledge*, pp. 216–231, date unknown.
D. Chaum, *Online Cash Checks*, pp. 288–293, date unknown.

* cited by examiner

*Primary Examiner*—Thomas R. Peeso
*Assistant Examiner*—Kambiz Zand
(74) *Attorney, Agent, or Firm*—Oliff & Berridge, PLC

(57) ABSTRACT

The present invention allows even small-size verification devices to authenticate rights and qualifications without leaking authentication characteristic information to third parties. A ticket issuance device computes document private information $\mu$ from a private function f of an interaction device owned by a user and document m to be transferred to the interaction device when generating interaction, and issues ticket t generated from authentication characteristic information x and the document private information $\mu$ to the user. The interaction device, when document m is input, generates document private information $\mu$ using a private function f specific to the interaction device, and performs interaction based on the document private information. The interaction comprises output of commitment r, input of challenge $\chi$, output of response $\sigma$, and message M output. The user converts interaction (r, $\chi$, M, $\sigma$) into interaction (r, $\chi$, M, s) using ticket t to perform Guillou-Quisquater authentication.

28 Claims, 12 Drawing Sheets

CONFIGURATION OF INTERACTION DEVICE

OPERATION OF INTERACTION DEVICE

CONFIGURATION OF TICKET ISSUANCE DEVICE

OPERATION OF TICKET ISSUANCE DEVICE

OPERATION OF TICKET VERIFICATION DEVICE

CONFIGURATION OF INTERACTION DEVICE

TICKET VERIFICATION DEVICE

OPERATION OF INTERACTION DEVICE

PROOF METHOD BY USE OF TICKET

CONFIGURATION OF APPLICATION EXAMPLE (MEMBERSHIP CARD)

CONFIGURATION OF APPLICATION EXAMPLE (PREPAID CARD)

METHOD AND DEVICE FOR AUTHENTICATION

BACKGROUND OF THE INVENTION

1. Field of the Invention

The present invention relates to information security techniques, and more particularly, to a method and a device that make it possible to hide private information itself while providing system users with prover functions based on the private information in an authentication code system that founds safety on the difficulty of an annihilator determination problem.

2. Prior Art

Decryption keys in the prior art public key cryptography, signature keys in signature, authentication keys in authentication are characteristic information for authenticating the holding of these pieces of private information. As an example, a description will be made of an authentication code system based on an authentication system proposed in "A practical zero-knowledge protocol fitted to security Microprocessor minimizing both transmission and Memory", Advances in Cryptology EUROCRYPT '88 (Lecture Notes in Computer Science v.330), C. G. Guenther (ed.), Springer-Verlag pp. 123–128 by Guillou and Quisquater.

FIG. 1 explains the flow of thee authentication code system.

Let n be a composite number that is difficult to factor into prime factors, G be a multiplicative group $(Z/nZ)^*$ of a residue class ring of rational integers modulo n, p be a prime number that does not divide Carmichael function $\lambda(n)$ of n, R be a space of commitments, $\pi$ be a function from G to R, C be a space of challenge, S be a space of message, $\phi$ be a mapping from a set-theoretic product $C \times S$ of C and S into $F_p$ ($F_p$ denotes the finite field of p-elements), $I \in G$ be a public verification information, and $x \in G$ satisfying $Ix^p=1$ be an authentication characteristic information.

A holder of characteristic information x can send any message $M \in S$ safely because pretending and tampering are prevented by performing the operation of a prover 200 as described below.

(1) Generate a random number $k \in G$ and send a commitment $r=\pi(k^p)$.

(2) Compute an exponent $C=\phi(\chi,M)$ by a given challenge $\chi$ and a message M to be sent and send the message M and a response $s=kx^C$.

Anyone who can know verification information I can verify the operation of the prover 200 by performing the operation of a verifier 100 as described below, and can assure himself that the prover 200 holds authentication characteristic information and a sent message is not tampered.

(1) After the commitment r is given, send the challenge $\chi$ generated at random to the prover 200.

(2) Make sure that the given message M and response s satisfy the following relation.

$$r=\pi(s^p I^{\phi(\chi,M)}) \quad \text{[Expression 2]}$$

These techniques are developed on the assumption that holders of the above-mentioned private information do not publicize it. Therefore, this allows ciphertext that can be decrypted by only persons holding these pieces of private information, signature that can be generated by only persons holding these pieces of private information, and authentication that makes it impossible for others to impersonate the holders of these pieces of private information.

Accordingly, the above-mentioned techniques can be used in only situations in which exposure of these pieces of private information is disadvantageous to the holders of them. A typical example of such situations is found in a case where the above-mentioned private information is held by only specific individuals and is characteristic information for authenticating the individuals.

In this case, the above-mentioned characteristic information plays a role similar just, to a home lock and an individual's seal. Practically, the construction of a lock and seal in the actual life as digital information can be easily implemented as a direct application of these cryptographic methods. For example, if a home lock is configured so that it is used as a verifier in the above-mentioned Guillou-Quisquater system and is unlocked only when the verification succeeds, the holding of authentication characteristic information x will be equivalent to the holding of a home lock.

3. Problems of the Prior Art

In contrast to the above-mentioned individual's home lock case where the exposure of authentication characteristic information is disadvantageous to the individual, there exist cases where the exposure is advantageous to the exposer. These are cases where an holder of characteristic information has the right and qualification to receive specific services. In these cases, an approach cannot be taken which distributes characteristic information representing rights and qualifications to persons having the rights and qualifications and verifies that they hold the characteristic information, as is the above-mentioned case of authenticating individuals. This is because the characteristic information is passed to a third party not having the rights and qualifications since the exposure of the characteristic information is not disadvantageous to the holder of them, so that an advantage can be illegally obtained from the third person.

Hence, heretofore, three types of methods described below have been employed in place of authentication methods employing the above-mentioned public key cryptographic techniques without modifications.

(1) A first method is that individuals hold private characteristic information belonging to the individuals and a party to verify the holding of rights and qualifications holds individuals having the rights and qualifications and private characteristic information of the individuals. This method can be used for authentication of rights and qualifications since the leak of characteristic information would be disadvantageous to individuals.

(2) A second method is that individuals hold private characteristic information belonging to the individuals and a party to verify the holding of rights and qualifications holds individuals having the rights and qualifications and public information corresponding to private characteristic information of the individuals. This method can be used for authentication of rights and qualifications since the leak of characteristic information would be disadvantageous to individuals.

(3) A third method is that a grantor of rights and qualifications passes a signature created from characteristic information held by the grantor to a grantee of a right and qualification and a verifier authenticates the right and qualification by verifying the signature. An example of this method is found in "Online Cash Checks", Advances in Cryptology EUROCRYPT '89 (Lecture Notes in Computer Science v. 434), J.-J. Quisquater, J. Vandewalle (ed.), Springer-Verlag, pp. 288–293 by D. Chaum.

According to this method, a problem with the leak of characteristic information will not occur since a party to prove the possession of right and qualification has no characteristic information.

However, with the first method, a verifier must hold a list of holders of right and qualification. This imposes the burden of storing and managing the list on the verifier, entailing a high-performance verification device. Also, since the verification device cannot be manufactured independently of the grantor of rights and qualifications, information must be exchanged at all times between the verification device and the grantor of rights and qualifications. Furthermore, since the verifier has individuals' characteristic information, individuals authenticated by this method will have a risk of the characteristic information being illegally leaked by the verifier.

With the second method, a verifier must hold a list of holders of rights and qualifications. This imposes the burden of storing and managing the list on the verifier, entailing a high-performance verification device. Also, since the verification device cannot be manufactured independently of the grantor of rights and qualifications, information must be exchanged at all times between the verification device and the grantor of rights and qualifications.

With the third method, since distributed signature information can be used by anyone, its duplication must be prevented. This is achieved by a method of preventing duplicate use of a signature value. To be specific, all signature values once used for authentication are stored in the verifier so that the verifier can check that they are not duplicately used. However, to provide this function for the verifier entails a high-performance verification device. Also, all verification devices to authenticate the same rights and qualifications must share a list of signature values once used for authentication, and therefore information must be exchanged at all times among the verification devices.

As described above, any of the three conventional methods contains a serious problem, making it difficult to configure particularly a verifier with small-scale devices and software.

On the other hand, the above-mentioned authentication method that uses characteristic information indicating rights and qualifications is advantageous in that the only task to be done by a verifier is to check to see whether characteristic information indicating rights and qualifications is held.

As described above, the prior art has been a problem in that if a small-scale verification device is used to authenticate rights and qualifications, there may arise a risk of authentication characteristic information leaking to outsiders, while if the risk is to be eliminated, the verification device becomes large-scale.

SUMMARY OF THE INVENTION

As described above, an object of the present invention is to implement an authentication code technique which enables a small-scale verification device to authenticate rights and qualifications without authentication characteristic information leaking to outsiders.

An authentication code technique of the present invention is based on:

(1) an interaction device that generates document private information from a document, which is releasable information defined at ticket issuance, and makes interaction based on the document private information, and (2) a ticket, which is releasable information generated from the document private information and authentication characteristic information.

That is, according to the present invention, where p is a prime number, $F_p$ is a p-element field, G is a finite Abelian group (described multiplicatively only for the purpose of fixing a notation. The present invention can also apply to groups customarily described additively, e.g., an elliptic curve, if it is difficult in point of computational complexity to obtain an annihilator) whose annihilator is difficult in point of computational complexity to obtain, R is a space of commitments, $\pi$ is a mapping from G to R, and C is a space of challenges, S is a space of messages, $\phi$ is a mapping from a set-theoretic product C×S of C and S into $F_p$, the following steps are executed in an interaction method by which commitment r is generated, and response $\sigma$ and message M are generated for document m and challenge $\chi$.

(a) Step to generate nonreproducible private information k∈G at random (b) Step to compute commitment $r=\pi(k^p)$ (c) Step to compute document private information $\mu=f(m)$ with f as a private function with valued in G (d) Step to generate message M (e) Step to compute exponent $C=\phi(\chi,M)$ (f) Step to compute response $\sigma=k\mu^C$ In this configuration, proof functions based on authentication characteristic information can be distributed without disclosing the authentication characteristic information in public key cryptography. Hence, it has become possible for a plurality of individuals having no interest with each other to safely perform proving based on identical authentication characteristic information. This has been heretofore impossible. Since public key cryptography based on Guillou-Quisquater authentication is employed, zero knowledgability is proved. Moreover, messages can be safely transferred.

DESCRIPTION OF THE PREFERRED EMBODIMENTS

Prior to the description of embodiments, the usage mode of the present invention will be described briefly.

Figure 2:
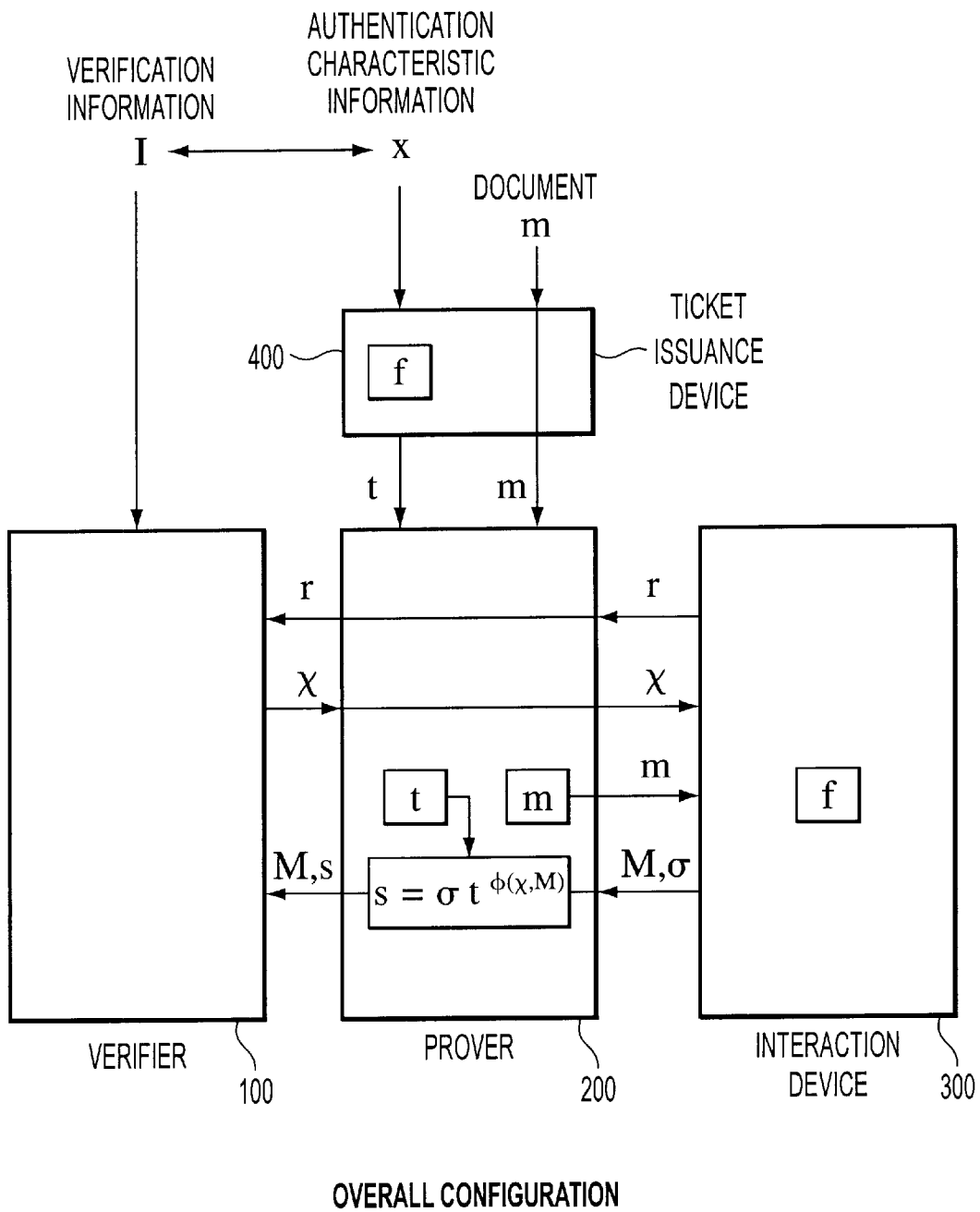
FIG. 2 shows an overall configuration.

FIG. 2 shows the configuration, of the overall configuration of the present invention.

A ticket issuer issues an interaction device 300 characterized by a specific private function and distributes it to users. If the private function characterizing the interaction device, 300 were known to the users, the interaction device 300 could be freely duplicated and tickets could be abused beyond control of the ticket issuer. Accordingly, the private function of the interaction device 300 can be protected against even authorized holders of the interaction device 300 trying to steal it.

The interaction device 300 may also be configured, e.g., as a smart card (IC card).

The interaction device 300, when data m called a document is input, generates document private information $\mu$ using a private function f specific to the interaction device 300, and performs interaction based on the document private information.

Figure 1:
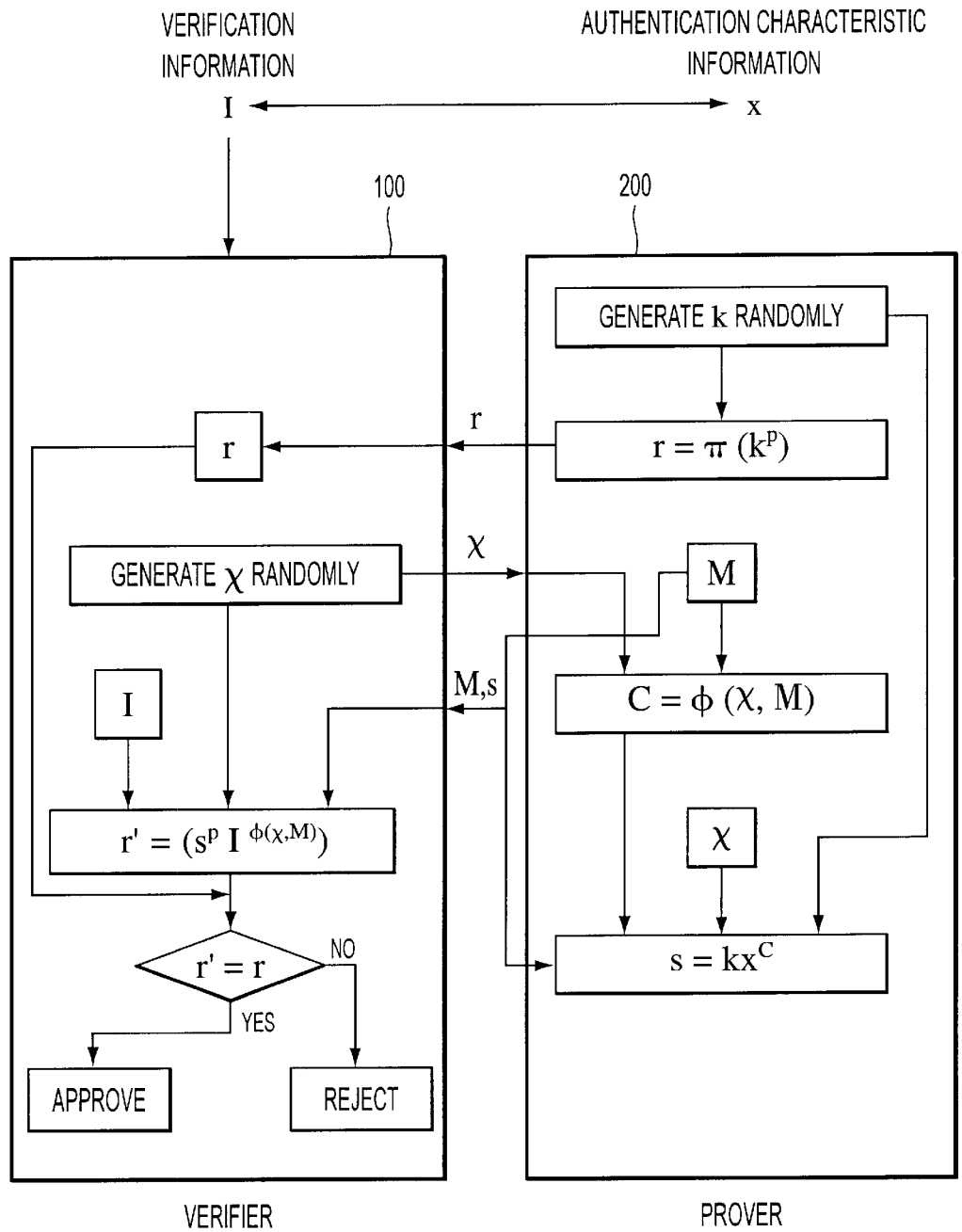
FIG. 1 shows the principle of an authentication method of the prior art.

Interaction is performed in the following processes:

(1) output of commitment r (2) input of challenge $\chi$ (3) output of message M and responses $\sigma$ The above interaction is nominally the same as that performed by provers in Guillou-Quisquater authentication. FIG. 1 shows the flow of Guillou-Quisquater authentication.

Documents are not only used to generate document private information. For example, documents can be programs and commands executable by the interaction device 300, and parameters for processing performed in or messages issued from the interaction device 300 to the prover 200 and to the verifier 100.

The issuance of ticket t by a ticket issuer in association with authentication characteristic information x is implemented by distributing a function to generate interaction (r, $\chi$, M, s) based on authentication characteristic information to a user by a method described below.

The ticket issuer uses the ticket issuance device 400 to compute document private information $\mu$ from a private function f of the interaction device 300 owned by the user and document m to be transferred to the interaction device when generating interaction, and issues ticket t generated from the authentication characteristic information x and the document private information $\mu$ to the user.

The authentication characteristic information x and the document private information $\mu$ are hidden from the user.

The user generates interaction (r, $\chi$, M, $\sigma$) by inputting the specified document m to the interaction device 300 and uses the issued ticket t to transform the interaction (r, $\chi$, M, $\sigma$) into interaction (r, $\chi$, M, s) based on authentication characteristic information associated with the ticket.

When commands of processing for the interaction device 300 are described in the document, interaction generation using a ticket is associated with the commands described in the document, whereby the effectivity of the ticket can be conditioned.

To be specific, interaction can be transformed by computing response s from challenge $\chi$, response $\sigma$ of the interaction device, message M, and ticket t.

It will be described in an embodiment that the transformed interaction (r, $\chi$, M, s) is nothing but an interaction generated by a prover of Guillou-Quisquater authentication in FIG. 1.

Characteristic information x of authentication associated with the ticket is generated independently of document private information $\mu$ that is different for each of various documents of each interaction device 300.

A ticket issuer can distribute a function of interaction based on given authentication characteristic information x to users in the form of ticket in association with an arbitrary document without disclosing the authentication characteristic information itself.

[Embodiment]
[Basic Components]

In the present invention, [Expression 3] the following are cryptographic basic components:

p prime number $F_p$ the finite field of p-elements

G Abelian group whose annihilator is difficult in point of computational complex to determine D space of commitments $\pi$ Mapping from G to D Mathematical concepts referred to hereinafter without being explained will not be explained herein because all of them are fundamental. Refer to Encyclopedic Dictionary of Mathematics (Third Edition) edited by Mathematical Society of Japan, published by Iwanami Shoten, Publishers, for example.

Generally, an annihilator Ann(G) of Abelian group G, if the operation of the group is described multiplicatively, is an ideal of a rational integer ring Z defined by $$Ann(G)=\{\lambda \in Z; \forall g \in G) g^{\lambda}=1\} \qquad \text{[Expression 4]}$$

and since the rational integer ring is a principal ideal domain, the above expression could be written as Ann(G)= $\lambda Z$ by a generating element $\lambda \epsilon$ of Ann(G), where $\lambda Z$ is all multiples of $\lambda$. Determining an annihilator means finding a generating element $\lambda \epsilon Z$ of Ann(G).

Letting n$\epsilon$Z be a composite number and G be a multiplicative group (Z/nZ)* of a residue class ring of a rational integers, modulo n, $\lambda=\lambda(n)$ is established, where $\lambda(n)$ is a Carmichael function of n, and when n is a power of 2, the following expression is satisfied:

[Expression 5]

$$\lambda(n) = \begin{cases} 1 & n = 2 \\ 2 & n = 4 \\ n/4 & n \notin \{2, 4\} \end{cases}$$

When n is a power of an odd prime p, $\lambda(n)=n(1-p^{-1})$ is satisfied, and if $n=\Pi p^{ep}$ represents factorization of general n into prime factors, $\lambda(n)$ is the least common multiple of $\lambda(p^{ep})$.

Accordingly, if factorization of n into prime factors is already known, since the annihilator of G can be obtained by polynomial time of log n, and conversely, if the generating element $\lambda$ of annihilator area is already known, by generating a non trivial square root of 1, that is, g satisfying the following expression, $$g \in G; g \notin \{1,-1\}; g^2=1 \qquad \text{[Expression 6]}$$

since n can be factored into prime factors by probabilistic polynomial time of log n, an annihilator determination problem in this case can be expected to be as difficult as a prime factor factorization problem in point of computational complexity. Letting $p_1$ and $p_2$ be mutually different odd prime numbers satisfying $p_1 \equiv p_2 \equiv 2$ mod 3, n be equal to $p_1 p_2$, b be an integer prime to n, E be an Abelian scheme defined on Z/nZ by a homogeneous equation, $$Y^2=X^3+bZ^3 \qquad \text{[Expression 7]}$$

that is, satisfy $$E=\text{Proj } Z/nZ[X,Y,Z]/(Y^2Z-X^3-bZ^3), \qquad \text{[Expression 8]}$$

and G be a finite group E(Z/nZ) consisting of Z/nZ value points of E, then $\lambda$ is the least common multiple of $p_1+1$ and $p_2+1$, in which case the annihilator area determination problem can also be expected to be difficult in point of computational complexity.

$\pi$ may be defined as, e.g., an identity mapping id:$G \rightarrow G$ or as h:$G \rightarrow D$ using a hash function h.

A hash function is a function from which it is expected to be difficult in point of computational complexity to find mutually different m and m' satisfying h(m)=h(m'); for example, MD5 by RSA Data Security Inc. and SHS (Secure Hash Standard) by the U.S. Federal Government are well known.

When $\pi$ is an identity mapping the cost of computing $\pi$ is unnecessary. When $\pi$ is a hash function and the bit length required to express the element of D is smaller than the bit length required to express the element of G, this produces the effect of reducing traffic.

For example, for a composite number n of about 1024 bits that is difficult to factor into prime factors, if SHS is used as $\pi$ letting G=(Z/nZ)*, the size of commitment r can be compressed down to 160 bits.

By the way, the bit length of p can be no more than 40 bits for authentication of question-and-answer type and no more than 160 bits for signature, accounting for fast Guillou-Quisquater authentication.

[Interaction Device]

Figure 3:
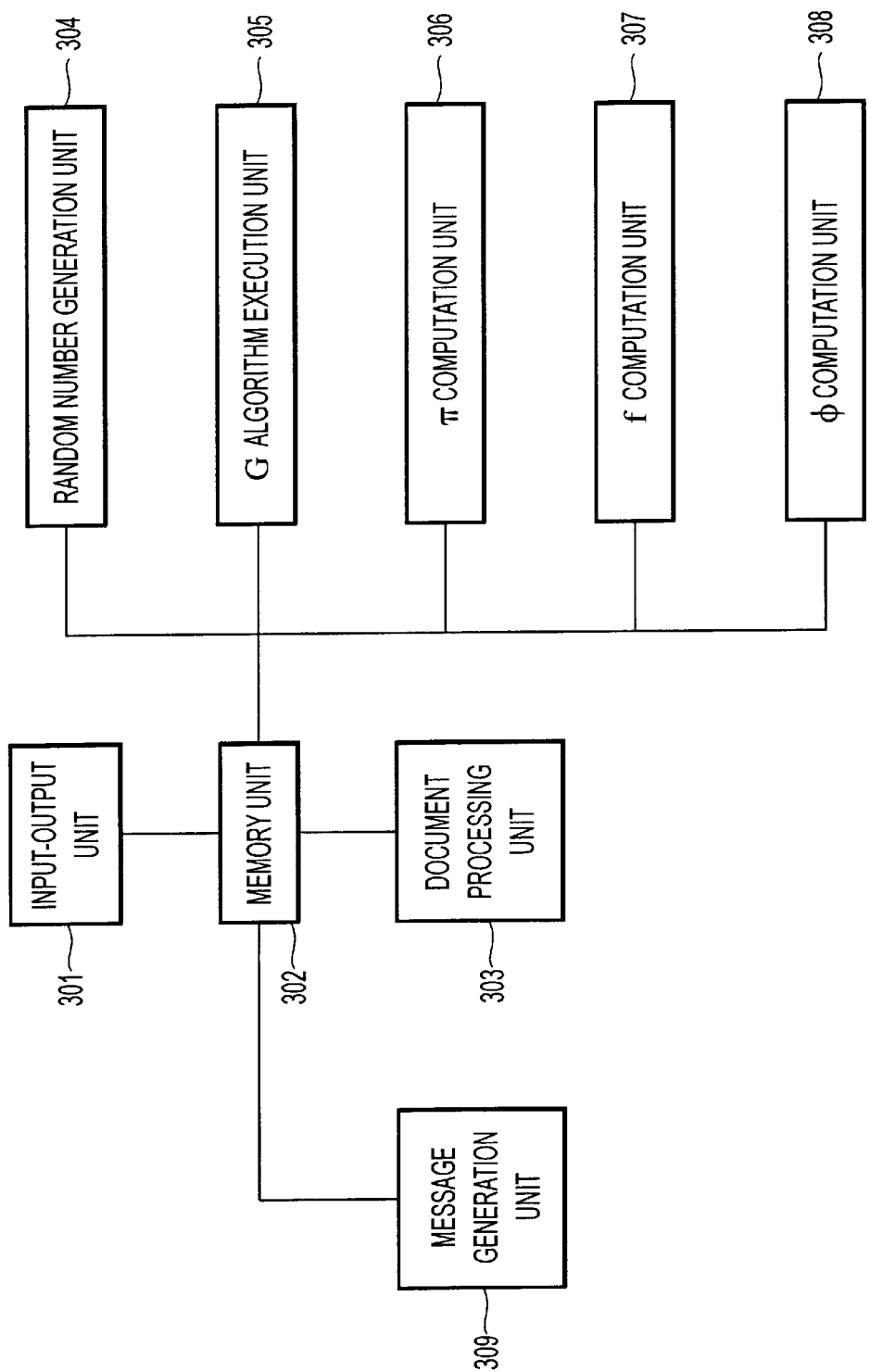
FIG. 3 shows the configuration of an interaction device.

FIG. 3 shows the configuration of an interaction device 300. The interaction device 300 is mounted as a tamperproof container and is characterized by a specific private function before being distributed to users. The interaction device 300 can also be configured as a portable compact computation device such as a smart card. The interaction device 300 comprises an input-output unit 301, a memory unit 302, a document processing unit 303, a random number generation unit 304, a G algorithm execution unit 305, a $\pi$ computation unit 306, an f computation unit 307, a $\phi$ computation unit 308, and a message generation unit 309.

Figure 4:
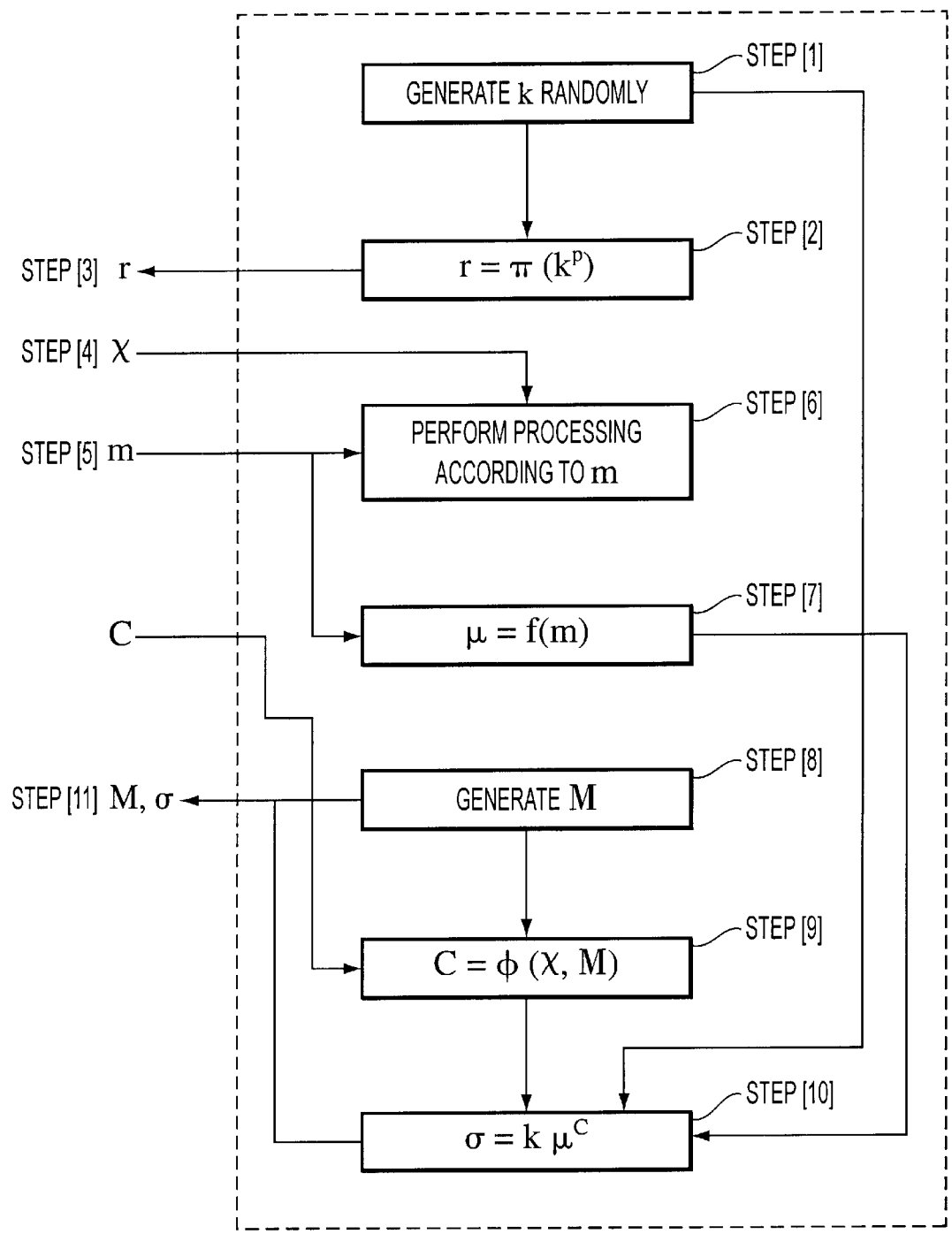
FIG. 4 shows the operation of :an interaction device.

FIG. 4 shows the operation of the interaction device 300. Hereinafter, the operation of the interaction 300 will be described.

Step [1] Generate nonreproducible private information k∈G using the random number generation unit 304 and store it in memory unit 302.

Step [2] Use the algorithm unit 305 in G and the $\pi$ computation unit 306 to compute commitment r from the nonreproducible private information k stored in the memory unit 302 by the following expression and store it in the memory unit 302:

$$r=\pi(k^p).$$ [Expression 9]

Of course, when $\pi$ is an identity mapping, the $\pi$ computation unit 306 is unnecessary.

Step [3] Use the input-output unit 301 to output the commitment r stored in the memory unit 302.

Step [4] Use the input-output unit 301 to input challenge $\chi$ and store it in the memory unit 302.

Step [5] Use the input-output unit 301 to input document m and store it in the memory unit 302.

Step [6] Use the document processing unit 303 and perform processing suitable for the document m stored in the memory unit 302.

Step [7] Use the computation unit 307 for a private function f specific to the interaction device to compute document private information $\mu$∈G from the document m stored in the memory unit 302 by the following expression and store the result in the memory unit 302:

$$\mu=f(m).$$ [Expression 10]

The computation unit 307 of the function f may be comprised of, e.g., the memory unit 302 for storing private information d specific to the interaction device and the computation unit of the hash function h to compute $$f(m)=h(d|m),$$ [Expression 11]

where "|" denotes the concatenation of bits.

Step [8] Use the message generation unit 309 to generate message M and store it in the memory unit 302.

Step [9] Use the $\phi$ computation unit 308 to compute exponent C from the challenge $\chi$ and message M stored in the memory unit 302 by the following expression and store the result in the memory unit 302:

$$C=\phi(\chi,M).$$ [Expression 12]

Step [10] Use the algorithm execution unit 305 in G to compute response $\sigma$ from the nonreproducible private information k, document private information $\mu$, and exponent C stored in the memory unit 302 by the following expression and store the result in the memory unit 302:

$$\sigma=k\mu^C.$$ [Expression 13]

Step [11] Use the input-output unit 301 to output the message M and response $\sigma$ stored in the memory unit 302.

Step [6] is not always required depending on the application. Accordingly, the interaction device 300 could also be configured without having the document processing unit 303. By providing the document processing unit 303, processing of the interaction device 300 can be changed for each interaction and a ticket described later can be provided with numerous functions.

[Constraints of Operation Execution Order]

Steps 1 to 11 need not always be performed sequentially in this order. When the order relation that step "a" must be executed before step "b" is represented by $$a \to b,$$ [Expression 14]

constraints of the execution order of the steps will be described.

$1 \to 2 \to 3 \to 4$ $5 \to 6,7$ $4,8 \to 9$ $7,9 \to 10 \to 11$ [Expression 15]

is a constraint on execution order that must always be satisfied.

When the operation of the document processing unit 303 influences other operations, a constraint of execution order will further arise as described below.

[When G, p, and $\pi$ are Variable]

When the document m defines G, $6 \to 2$ is requested. This is true of a case where the interaction device is configured so that parameters defining G are described in document m, the parameters are specified in step [6], and the algorithm execution unit in G can perform computations according to the specified parameters.

When the document m defines p, $6 \to 2$ is requested. This is true of a case where the interaction device is configured so that parameters defining p are described in document m, the parameters are specified in step [6], and the algorithm execution unit in G can perform computations according to the specified parameters.

When the document m defines $\pi$, $6 \to 2$ is requested. This is true of a case where the interaction device is configured so that parameters defining G are described in the document m, the parameters are specified in step [6], and the $\pi$ computation unit can perform computations according to the specified parameters.

In these examples, although G, p, and $\pi$ can be changed for each interaction, these can also be constructionally fixed.

[Prior Execution of Power Computation]

Herein, G, p, and π are assumed to be fixed.

If a plurality of sets (k, r) of nonreproducible private information and commitment can be stored in the memory unit 302, since prior repeated executions of steps [1] and [2] in this order eliminate the need to generate commitment r immediately before challenge $\chi$ is input, the interaction device requires less time for interaction.

The only portion specific to each interaction device is a private function f and therefore the portion of generating commitment r can be separated and shared.

Figure 8:
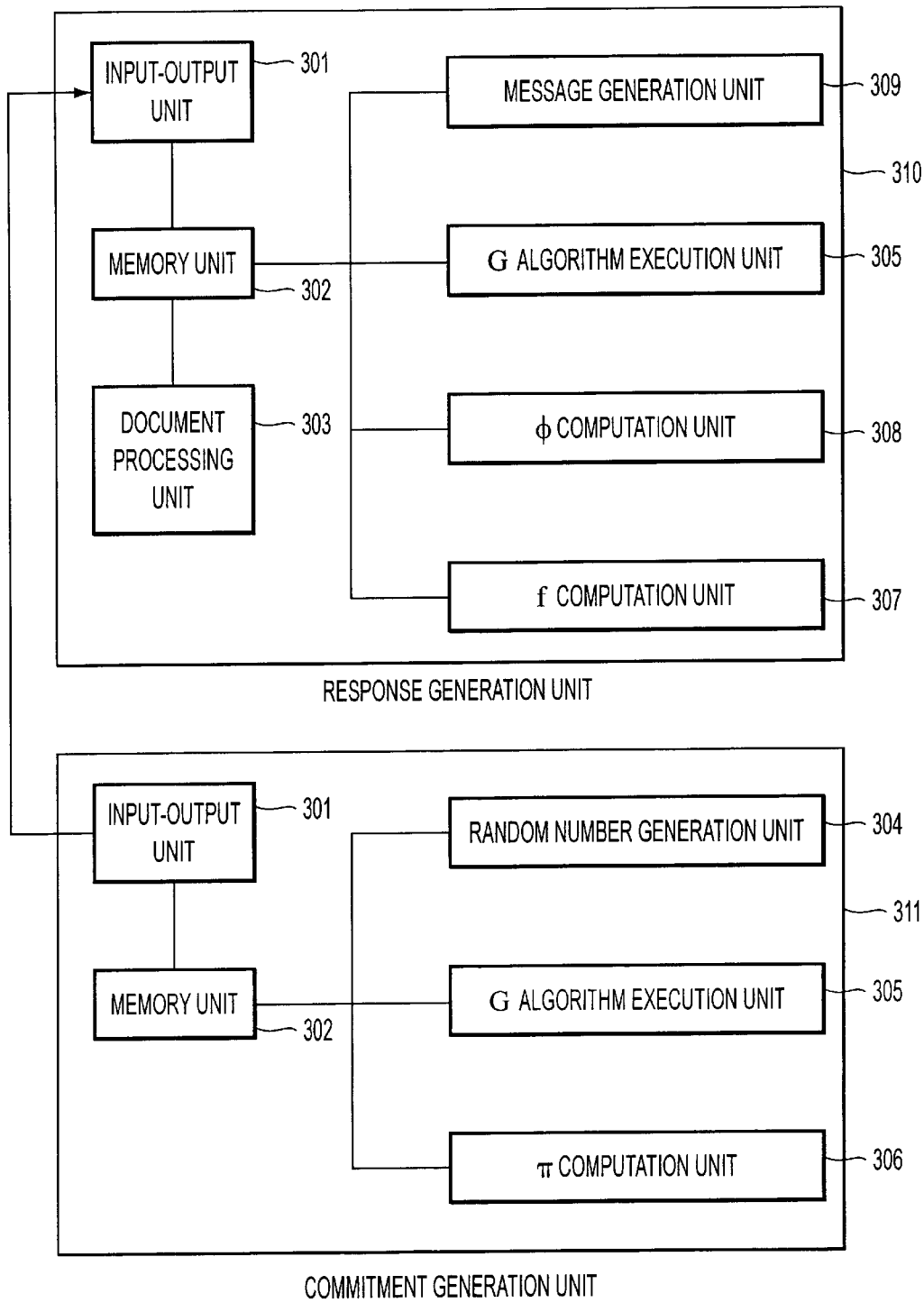
FIG. 8 shows the configuration of an interaction device.

FIG. 8 shows the configuration of an interaction device from which a power computation unit is separated. In this configuration example, the interaction device 300 is divided into a response generation unlit 310 and a commitment generation unit 311, and steps [1] and [2] are performed in the commitment generation unit 311. In FIG. 8, locations corresponding to FIG. 3 ares assigned the corresponding reference numerals.

Nonreproducible private information k is transferred from the commitment generation unit 311 to the response generation unit 310 by private communication.

The response generation unit may also be configured as a smart card.

[When Conditions of Response Generation are Variable]

When the document m defines conditions for response generation, the conditions for response generation are specified in the document m and processing is stopped if the conditions are not satisfied in step [6].

Specific examples of processing in accordance with the document m will be described.

For example, conditions of challenge $\chi$ to permit the generation of response are specified in the document m, and if the challenge $\chi$ stored in the information memory unit 302 does not satisfy the conditions in step [6], the interaction device 300 stops processing.

Examples of conditions of challenge to permit the generation of response will be described. A parameter for defining the expiration date of response generation is specified in the document m, a specific bit field when challenge $\chi$ is expressed as a bit string is regarded as the expression of current time, the expiration date and the current time are compared, and the interaction device 300 stops processing if the expiration date has elapsed.

For example, the document processing unit 303 has a clocking unit to hold current time, a parameter for defining the expiration date of response generation is specified in the document m, the expiration date and current time are compared in step [6], and the interaction device 300 stops processing if the expiration date has elapsed.

For example, the document processing unit 303 has a counter, a flag to define whether to decrement the value of the counter is specified in the document m, and when the flag indicates decrement operation in step [6], if a counter value is not 0, the counter value is decremented by 1; if 0, the interaction device 300 stops processing.

For example, the document processing unit 303 has a counter, a value by which to decrement the counter is specified in the document m, and if the counter value is not smaller than the value to decrement in step [6], the counter value is decremented by the specified value; otherwise, the interaction device 300 stops processing.

For example, the document processing unit 303 has a plurality of counters, pointers to define corresponding counters are specified in the document m, and if the value of the defined counter is not 0 in step [6], the counter value is decremented by 1; if 0, the interaction device 300 stops processing.

For example, the document processing unit 303 has a plurality of counters, pointers to define corresponding counters and a value to decrement are specified in the document m, and if the value of the defined counter is not smaller than the value to decrement in step [6], the counter value is decremented by the specified value; otherwise, the interaction device 300 stops processing.

[When a Method of Generating Messages is Defined in a Document]

The document m defines a method of generating messages. This is true of a case where parameters for defining message generation are described in the document m, the parameters are specified in step [6], and the message generation unit 309 generates messages according to the specified parameters.

Specific examples of processing in accordance with the document m will be described.

The simplest case is found when a message M is determined as a function of the document m. For example, a specific bit field in the document m is used as a message M.

For example, conditions of challenge $\chi$ to permit the generation of response are specified in the document m, and if the challenge $\chi$ stored in the information memory unit 302 does not satisfy the conditions step [6], the interaction device 300 stops processing.

Examples of conditions of challenge to permit the generation of response will be described. A parameter for defining the expiration date of response generation is specified in the document m, a specific bit field when challenge $\chi$ is expressed as a bit string is regarded as the expression of current time, the expiration date and the current time are compared, and the interaction device 300 stops processing if the expiration date has elapsed.

For example, the document processing unit 303 has a clocking unit to hold current time, a parameter for defining the expiration date of response generation is specified in the document m, the expiration date and current time are compared in step [6], and the interaction device 300 stops processing if the expiration date has elapsed.

For example, the document processing unit 303 has a counter, a flag to define whether to decrement the value of the counter is specified in the document m, and when the flag indicates decrement operation in step [6], if a counter value is not 0, the counter value is decremented by 1 and a flag (indicating whether the decrement operation has succeeded or not) stored in the message generation unit 309 is turned on; if the counter value is 0, the flag stored in the message generation unit 309 is turned off, and the message generation unit 309 generates a message as a set of the counter value and a flag value indicating whether the decrement operation has succeeded.

For example, the document processing unit 303 has a counter, a value by which to decrement the counter is specified in the document m, and if the counter value is not smaller than the value to decrement in step [6], the counter value is decremented by the specified value, the flag (indicating whether the decrement operation has succeeded or not) stored in the message generation unit 309 is turned on; if the counter value is smaller than the value to decrement, the flag stored in the message generation unit 309 is turned off, and the message generation unit 309 generates a message as a set of the counter value and a flag value indicating whether the decrement operation has succeeded.

For example, the document processing unit 303 has a plurality of counters, pointers to define corresponding counters are specified in the document m, and if the value of the defined counter is not 0 in step [6], the counter value is decremented by 1 and the flag stored in the message generation unit 309 is turned on; if the value of the defined counter is 0, the flag stored in the message generation unit 309 is turned off and the message generation unit 309 generates a message as a set of the value of the defined counter and the flag value.

For example, the document processing unit 303 has a plurality of counters, pointers to define corresponding counters and a value to decrement are specified in the document m, and if the value of the defined counter is not smaller than the value to decrement in step [6], the counter value is decremented by the specified value and the flag stored in the message generation unit 309 is turned on; if the value of the defined counter is smaller than the value to decrement, the flag stored in the message generation unit 309 is turned off and the message generation unit 309 generates a message as a set of the value of the defined counter and the flag value.

[Document Processing and Other Examples]

For example, the document processing unit 303 has a counter, a value to increment is specified in the document m, and the counter value is incremented by the specified value in step [6].

For example, the document processing unit 303 has a plurality of counters, pointers to define corresponding counters and a value to increment are specified in the document m, and the value of the defined counter is incremented by the specified value in step [6].

For example, the document processing unit 303 has a clocking unit to hold current time and a unit to hold history information, a flag to define whether to record history is specified in the document m, and if the flag indicates the recording of history, a tuple of the current time stored in the clocking unit and the document m is stored in the history memory unit.

[Batch Processing of a Plurality of Documents]

In the examples described above, only one document m is involved in one interaction, but a construction can also be made so that a plurality of documents $m_1, \ldots, m_N$ can be involved.

Figure 10:
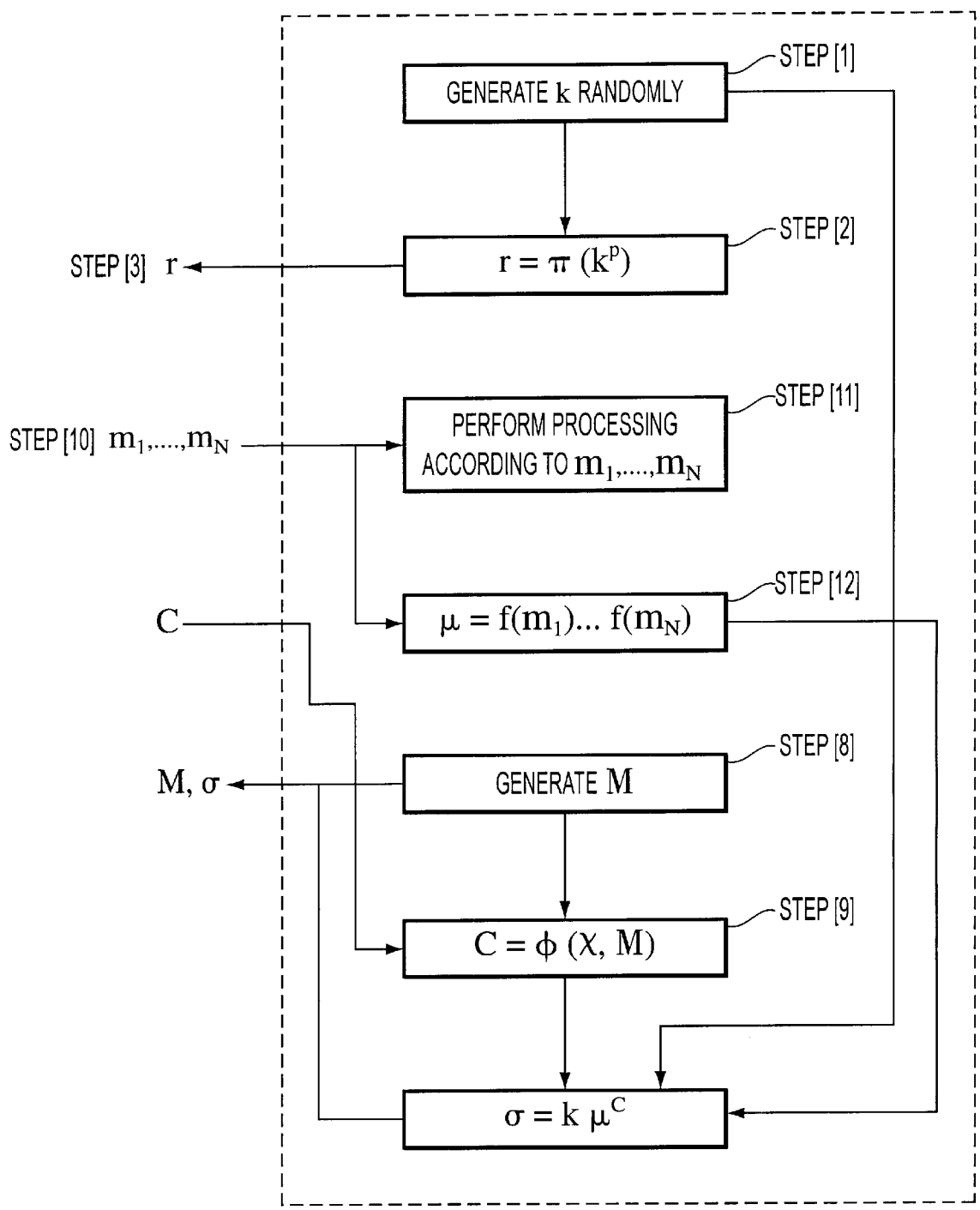
FIG. 10 shows the operation of an interaction device.

FIG. 10 shows the operation of an interaction device that performs batch processing for a plurality of documents.

When a plurality of documents is to be handled in one interaction, steps [5] to [7] have to be replaced by the following steps [10] to [12].

Step [10] Use the input-output unit 301 to input documents $m_1, \ldots, m_N$ and store them in the memory unit 302.

Step [11] Use the document processing unit 303 and perform processing sequentially in accordance with the documents $m_1, \ldots, m_N$ stored in the memory unit 302.

Step [12] Use the computation unit 307 of a private function f specific to the interaction device to compute document private information $\mu \epsilon G$ from the documents $m_1, \ldots, m_N$ stored in the memory unit 302 by the following expression and store it in the memory unit 302.

$$\mu = f(m_1) \ldots f(m_N). \qquad \text{[Expression 16]}$$

Of course, when a plurality of documents are to be handled in one interaction, care must be taken so that there is no conflict among the execution results of processing for each document $m_i$.

[Ticket Issuance Device]

The ticket issuance device 400 uses the following authentication information I and authentication characteristic information x.

$$I \epsilon G \text{ Verification information} \qquad \text{[Expression 17]}$$

$x \epsilon G$ Authentication characteristic information where authentication characteristic information x and verification information I satisfy the following relation:

$$Ix^p = 1.$$

Assume that the generator $\lambda$ of an annihilator Ann (G) is known. If p is prime to $\lambda$, since d satisfying $$pd = 1 \bmod \lambda \qquad \text{[Expression 18]}$$

can be computed, for any verification information I, corresponding authentication characteristic information x can be obtained as $$x = I^{-d}. \qquad \text{[Expression 19]}$$

Also, when p=2, if n is a Blum number in $G=(Z/nZ)^*$, I can be defined almost arbitrarily. For details, refer to "How to prove yourself: practical solutions to identification and signature problems", Advances in Cryptography CRYPTO '86 (Lecture Notes in Computer Science v. 263), A. M. Odlyzko (ed.), Springer-Verlag, pp. 186–194 by Fiat and Shamir.

Figure 5:
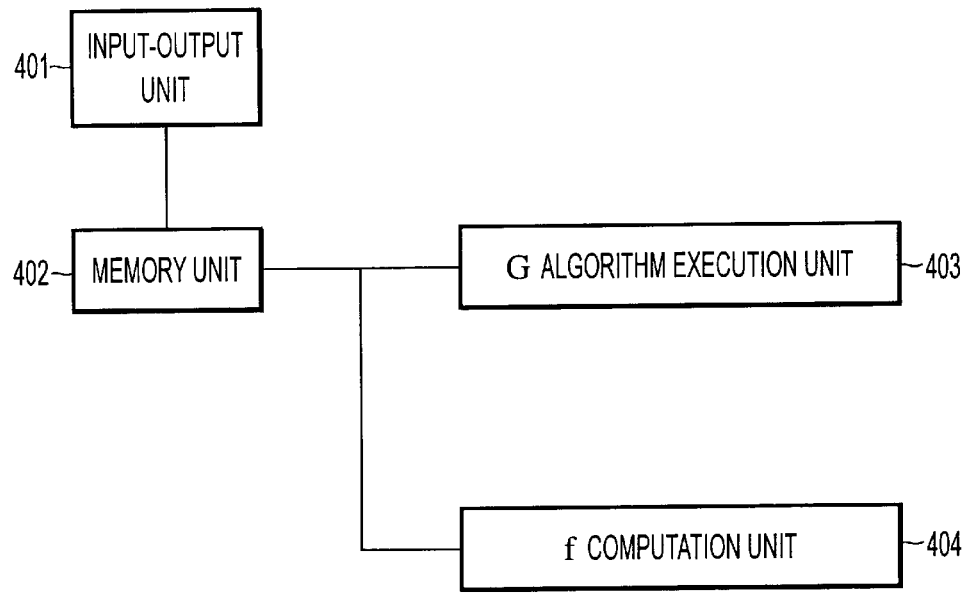
FIG. 5 shows the configuration of a ticket issuance device.
Figure 6:
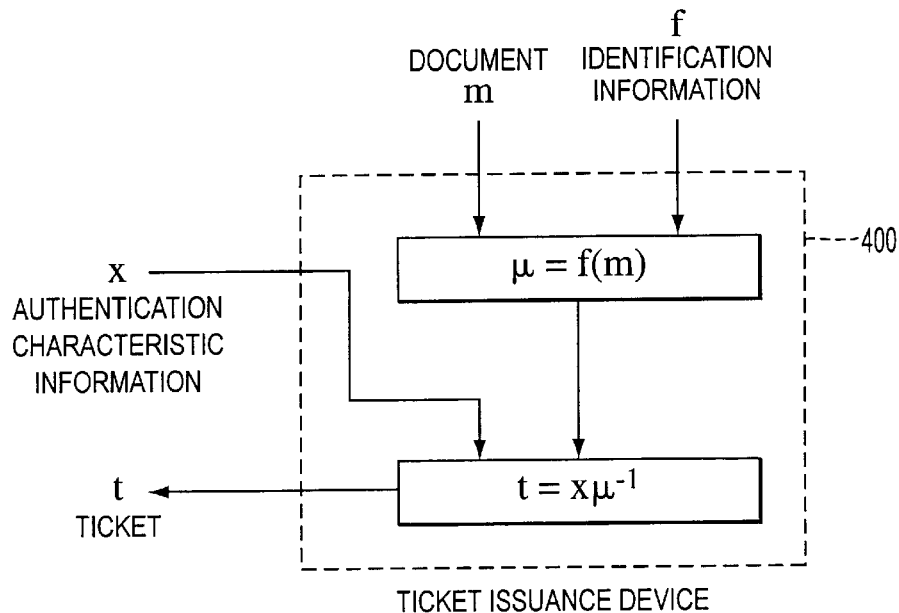
FIG. 6 shows the operation of a ticket issuance device.

FIG. 5 shows the configuration of a ticket issuance device and FIG. 6 shows the operation of the ticket issuance device. The ticket issuance device 400 comprises an input-output unit 401, a memory unit 402, a G algorithm execution unit 403, and an f computation unit 404. Hereinafter, the operation of the ticket issuance device 400 will be described.

[1] Use the input-output unit 401 to input authentication characteristic information x and store it in the memory unit 402.

[2] Use the input-output unit 401 to input document m and store it in the memory unit 402.

[3] Use the input-output unit 401 to input the identifier U of the interaction device 300 and store it in the memory unit 402.

[4] Use the computation unit 404 of a private function f specific to an interaction device 300 corresponding to the identifier U stored in the memory unit 402 to compute document private information $\mu$ from the document m stored in the memory unit 402 by the following expression and store the result in the memory unit 402:

$$\mu = f(m). \qquad \text{[Expression 20]}$$

[5] Use the algorithm execution unit/403 in G to compute ticket t from the authentication characteristic information x and document private information $\mu$ stored in the memory unit 402 by the following expression and store the result in the memory unit 402:

$$t = x\mu^{-1}. \qquad \text{[Expression 21]}$$

[6] Use the input-output unit 401 to output the ticket t stored in the memory unit 402.

The private function f specific to the interaction device 300, for example, as described in the section of an interaction device, may also be computed as $f(m)=h(d|m)$ using private information d specific to the interaction device 300 and a hash function h.

The private information d specific to the interaction device 300 may also be generated at random by, e.g., a ticket issuer so that a tuple (U,d) with the identifier U of the interaction device is stored.

Using private information D of a ticket issuer, the private information d specific to the interaction device 300 may also be generated to satisfy the following expression where U is the identifier of the interaction device 300:

$$d = U|D. \qquad \text{[Expression 22]}$$

However, generating d in this manner has the problem that the private information D of the ticket issuer may leak when the tamper-proof capability of the interaction device collapses.

It is more desirable that a hash function h is used to generate d as $$d=h(U|D)$$ [Expression 23]

because the interaction device 300 need not hold D and it is difficult to obtain D from d because of the one-way nature of the hash function.

The document m can afford any values that can become input values of the private function f.

Further, the document m may also describe processing to be performed by the document processing unit 303 of the interaction device 300 as described in the section of an interaction device.

Further, the document m may also describe information to identify tickets.

For example, a provider's identifier, the identifier of service provided by a ticket, a sequential ID assigned in the order of ticket issuance may also be included in the document m.

A ticket issuer, for example, can also manage authentication characteristic information x and an identifier thereof to include the identifier in the document m.

For example, values determined from public information I corresponding to authentication characteristic information x may also be included.

[Method of Synthesizing Ticket]

Here, let G, p, and π be common to the system and the interaction device 300 correspond to a plurality of documents.

Let $t_1, \ldots, t_N \in G$ be tickets generated for the interaction device 300 having a specific private function f and $I_i \in G$ be verification information corresponding to each ticket $t_i$ when $1 \leq i \leq N$.

A synthesized ticket t corresponding to synthesized verification information $I=I_1 \ldots I_N$ can be generated as the following expression.

$$t=t_1 \ldots t_N.$$ [Expression 24]

Document $m_i$ corresponds to ticket $t_i$ and authentication characteristic information $x_i$ corresponds to verification information $I_i$. That is, letting $I_i x_i^P=1$, since document private information $\mu_i=f(m_i)$ is $$\mu_i=t_i^{-1}x_i,$$ [Expression 25]

letting $x=x_1 \ldots x_N$, x is authentication characteristic information corresponding to synthesized verification information I, that is, $Ix^P=1$, and document private information $\mu=f(m_1) \ldots f(m_N)$ satisfies the following expression.

$$\mu=t^{-1}x.$$ [Expression 26]

[Proof Method by use of Ticket]

Figure 11:
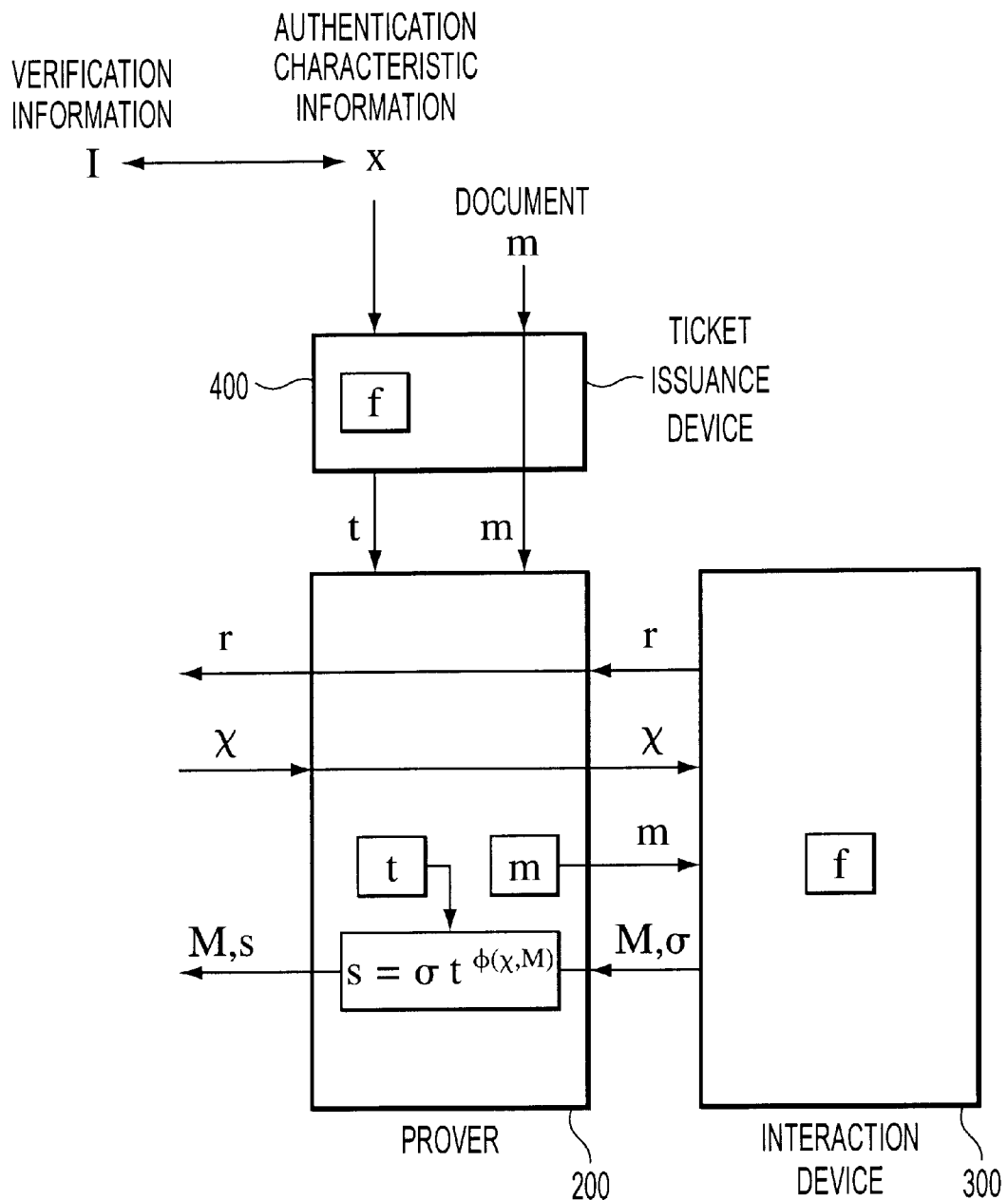
FIG. 11 shows the principle of a proving method by use of ticket.

FIG. 11 shows the operation of a proof method by use of ticket.

Hereinafter, a description will be made of a proof method by use of ticket and an interaction device.

Assume that a user has an interaction device characterized by a private function f, and document m and ticket t that satisfy $t=xf(m)^{-1}$.

Commitment r, and message M and response s for challenge χ are generated in a way described below.

[1] Use the interaction device 300 to obtain commitment r.

[2] Use the interaction device 300 to obtain message M and response σ corresponding to document m and challenge χ.

[3] Compute exponent C from challenge χ and obtained message M by the expression $C=\phi(\chi,M)$.

[4] Compute response s from ticket t, exponent C, and obtained response σ by the following expression.

$$s=t^C\sigma.$$ [Expression 27]

At this time, (r,χ,M,s) satisfies the following expression.

$$r=\pi(s^pI^{\phi(\chi,M)}).$$ [Expression 28]

In this way, without telling the user the authentication characteristic information x, by using the interaction device 300 and ticket t, a prover function shown in FIG. 1 for verification information I can be distributed.

Since a verifier corresponding to the prover is exactly the same as that in the conventional example shown in FIG. 1, the verification device needs only the verification information I, so that a great number of users can be authenticated simply with an extremely small device. [Flat-Shamir authentication]

Particularly when p=2, $$r=\pi(s^2I^C)$$ [Expression 29]

is satisfied; the relationship of so-called Fiat-Shamir authentication is satisfied.

In this way, without telling the user the private information x, by using an interaction device and ticket t, the prover function of Fiat-Shamir authentication for verification information I can be distributed.

For details of Fiat-Shamir authentication, refer to "How to prove yourself: practical solutions to identification and signature problems".

[Guillou-Quisquater Authentication]

Particularly, when p is prime to the generator χ of an annihilator of G, it means that a user has behaved as a prover of Guillou-Quisquater authentication.

In this way, without telling the user the private information x, by using an interaction device and ticket t, the prover function of Fiat-Shamir authentication for verification information I can be distributed.

[Ticket Verification device]

Figure 7:
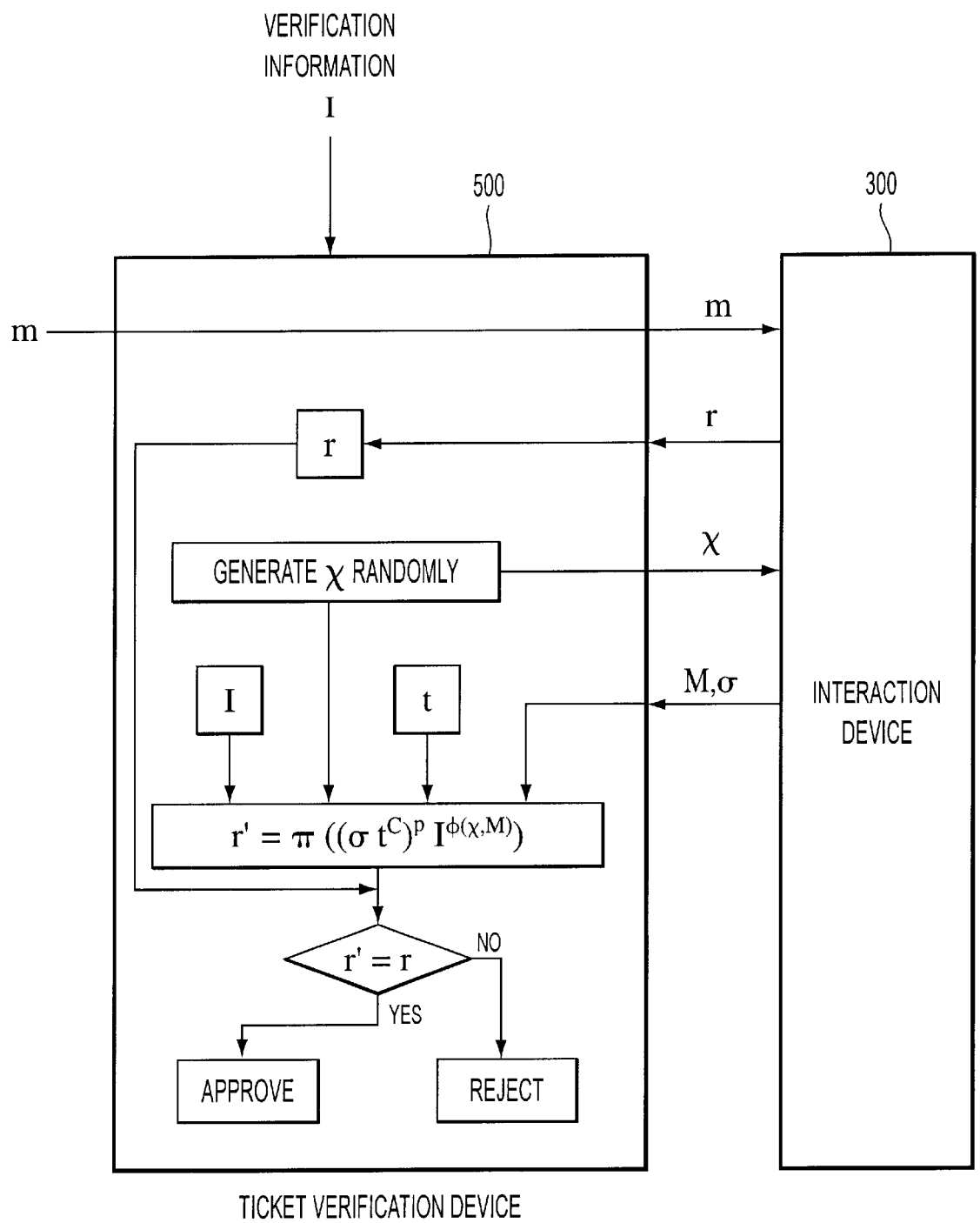
FIG. 7 shows the operation of a ticket verification device.
Figure 9:
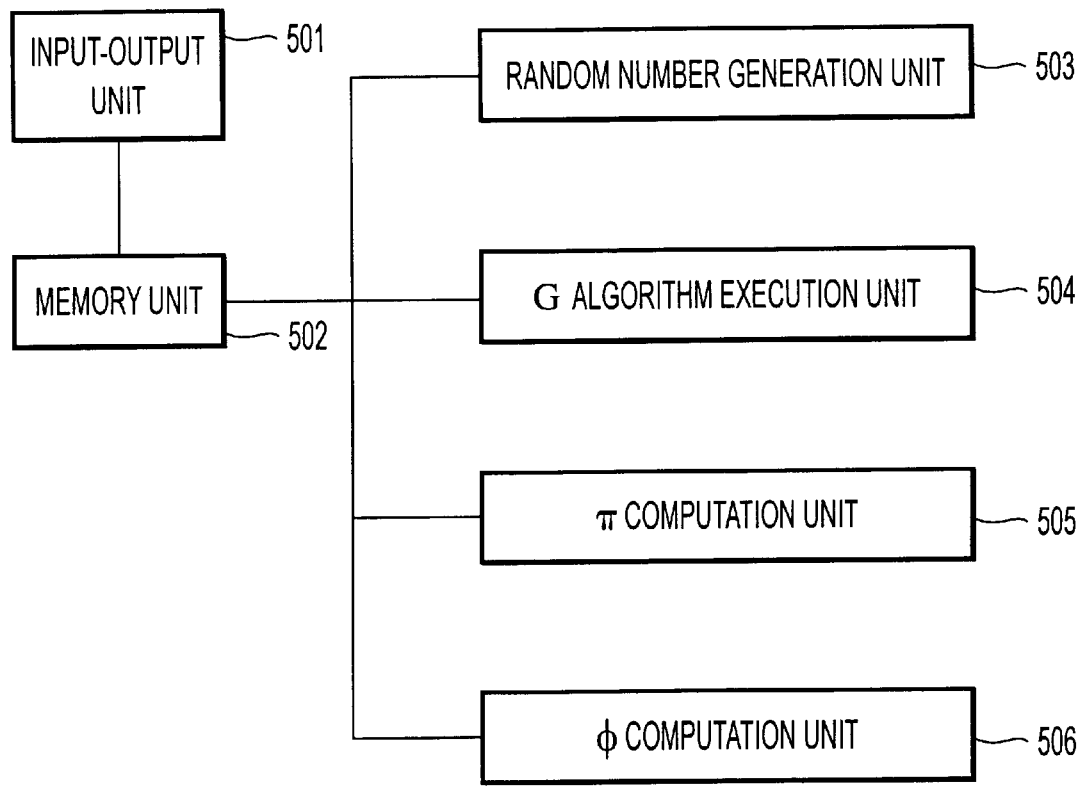
FIG. 9 shows the configuration of a ticket verification device.

FIG. 9 shows the configuration of a ticket verification device and FIG. 7 shows the operation of a ticket verification device.

A ticket verification device verifies tickets by interacting with an interaction device. The ticket verification device 500 comprises an input-output unit 501, a memory unit 502, a random number generation unit 503, a G algorithm execution unit 504, a π computation unit 505, and a φ computation unit 506.

Hereinafter, the operation of the ticket verification device 500 will be described.

The ticket verification device 500 stores verification information I and ticket t in the memory unit 502.

[1] Use the input-output unit 501 to input commitment r and store it in the memory unit 502.

[2] Use the random number generation unit 503 to generate challenge χ and store it in the memory unit 502.

[3] Use the input-output unit 501 to output the challenge x stored in the memory unit 502.

[4] Use the input-output unit 501 to input message M and response σ and store it in the memory unit 502.

[5] Use the φ computation unit 506 to compute exponent C from the challenge χ and message M stored in the memory unit 502 as $C=\phi(\chi,M)$, and store the result in the memory unit 502.

[6] Use the algorithm execution unit 504 in G, and if necessary the π computation unit 505 to compute $$r' = \pi((t^c \sigma)^p I^c)  \quad \text{[Expression 30]}$$

from C, σ, I, and ticket t stored in the memory unit 502, and store the results in the memory unit 502.

If π is an identity mapping, the π computation unit is not required.

r' may be computed as e.g., $r' = \pi((t^p I)^C \sigma^p)$.

[7] Compare r with r' stored in the memory unit 502.

If ticket t corresponds to document private information μ and authentication characteristic information x, $$\mu = t^{-1} x \quad \text{[Expression 31]}$$

is satisfied and, in interaction based on document private information μ, (r,χ,M,σ) satisfies $$r = k.$$

and $$\sigma = k\mu^{\phi(\chi, M)}. \quad \text{[Expression 32]}$$

Accordingly, in interaction between the interaction device 300 satisfying μ=f(m) where f is a private function, and the verification device 500, r=r' is satisfied.

[For a Variable Number of Tickets]

Herein, a description will be made of a configuration in which tickets are input to the input-output unit 501 and the input tickets are stored in the ticket memory unit 502.

Prior to steps [1] to [6], the ticket verification device 500 performs the steps described below.

[8] Use the input-output unit 501 to input ticket t and store it in the memory unit 502.

This configuration permits verification of a plurality of tickets.

When space of commitments R and space of challenges C are equal and a function to generate an exponent, which uses a hash function h, satisfies $$\phi(\chi, M) = h(\chi | M), \quad \text{[Expression 33]}$$

then, letting challenge χ be commitment r itself, that is, letting χ=r, for interaction succeeding in verification, signature (M,R,s) may be stored as a verification history in the memory unit.

This configuration makes it possible to prove to a third party that ticket authentication has been surely performed.

Of course, a verification expression used by the third party to verify signature (M,R,s) is $$r = s^p I^{h(r|M)}. \quad \text{[Expression 34]}$$

[Application Example: Membership Card]

A description will be made of an example of application of the interaction device 300 and the prover function by use of ticket having been heretofore described to actual applicative aspects.

Figure 12:
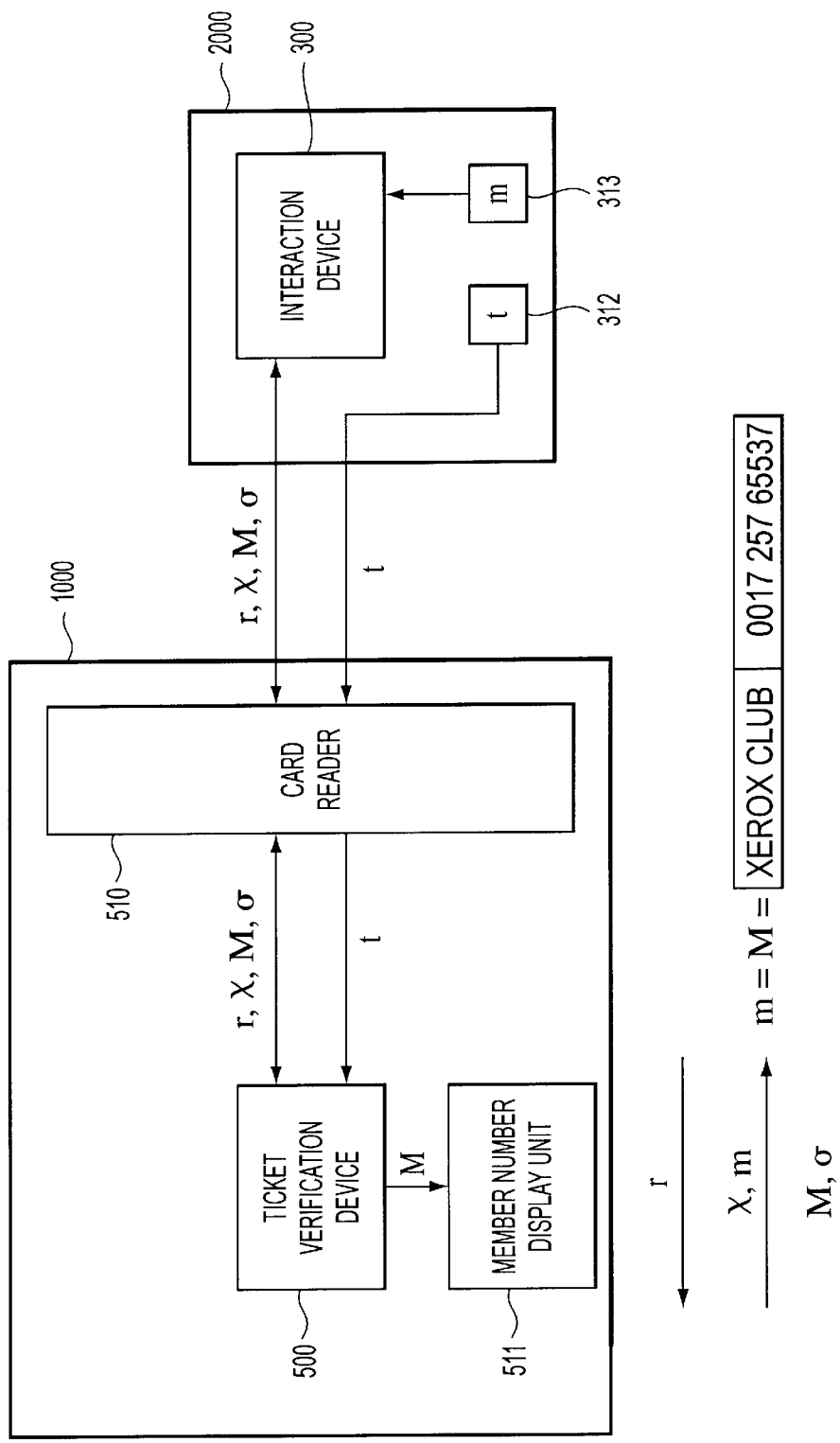
FIG. 12 shows the configuration of an application example.

An example of application to membership cards will be described using FIG. 12. In this application example, authentication characteristic information x is made to correspond with service, a ticket provides a qualification for using the service, and a message transferred during proof contains the service name and an identifier as a service user, that is, a member's ID code.

A ticket in this application example implements by a bit string a membership card or the like usually implemented by a plastic card or the like.

A ticket issuer is a service provider and a membership card verification device 1000 is composed of:
(1) smart card reader 510
(2) membership number display unit 511
(3) ticket verification device 500 implemented as a program burnt into a ROM within the smart card reader.

The display unit 511, when ticket verification succeeds, displays a transferred message, i.e., a member's ID code, and gives an error indication when ticket verification fails.

The smart card reader 510 has a slot for inserting a smart card to communicate with the smart card.

Assume that a service user owns a smart card 2000 composed of a ticket memory unit 312, a document memory unit 313, and an interaction device 300.

The service user, when making member registration, presents the identifier of his interaction device 300 to have a ticket corresponding to the interaction device 300 issued, and inputs it along with a document to the smart card 2000, for example.

A document is composed of a field to represent a service name (e.g., "Xerox Club") and a field to represent a member's ID code (e.g., "0017 257 65537").

When using the service, the user inserts the smart card 2000 into the membership card verification device 1000 to perform ticket authentication.

Herein, a construction is made so that messages generated by the interaction device 300 are documents themselves.

If an input part different from the smart card reader 510 within the membership card verification device 1000 is provided to input tickets and documents, tickets and smart cards need not necessarily be stored in the smart card 2000.

For example, a user carries a smart card 2000 comprising only an interaction device 300 and may store tickets and documents in portable information equipment different from the smart card 2000 or store them in a home PC to obtain them using portable communication equipment as. required.

A ticket need not always be issued at the time of member registration; it can also be replaced by a plastic membership card already held by the user.

A ticket issuer may be provided independently of a service provider so that the service provider commits the issuance of tickets to service users to the independent ticket issuer.

If a ticket issuer is provided independently, since tickets corresponding to various services can be issued to a single interaction device 300, users can hold a plurality of membership cards and the like exactly only as electronic information if only the users have the only interaction device 300.

[Application Example: Prepaid Card]

Figure 13:
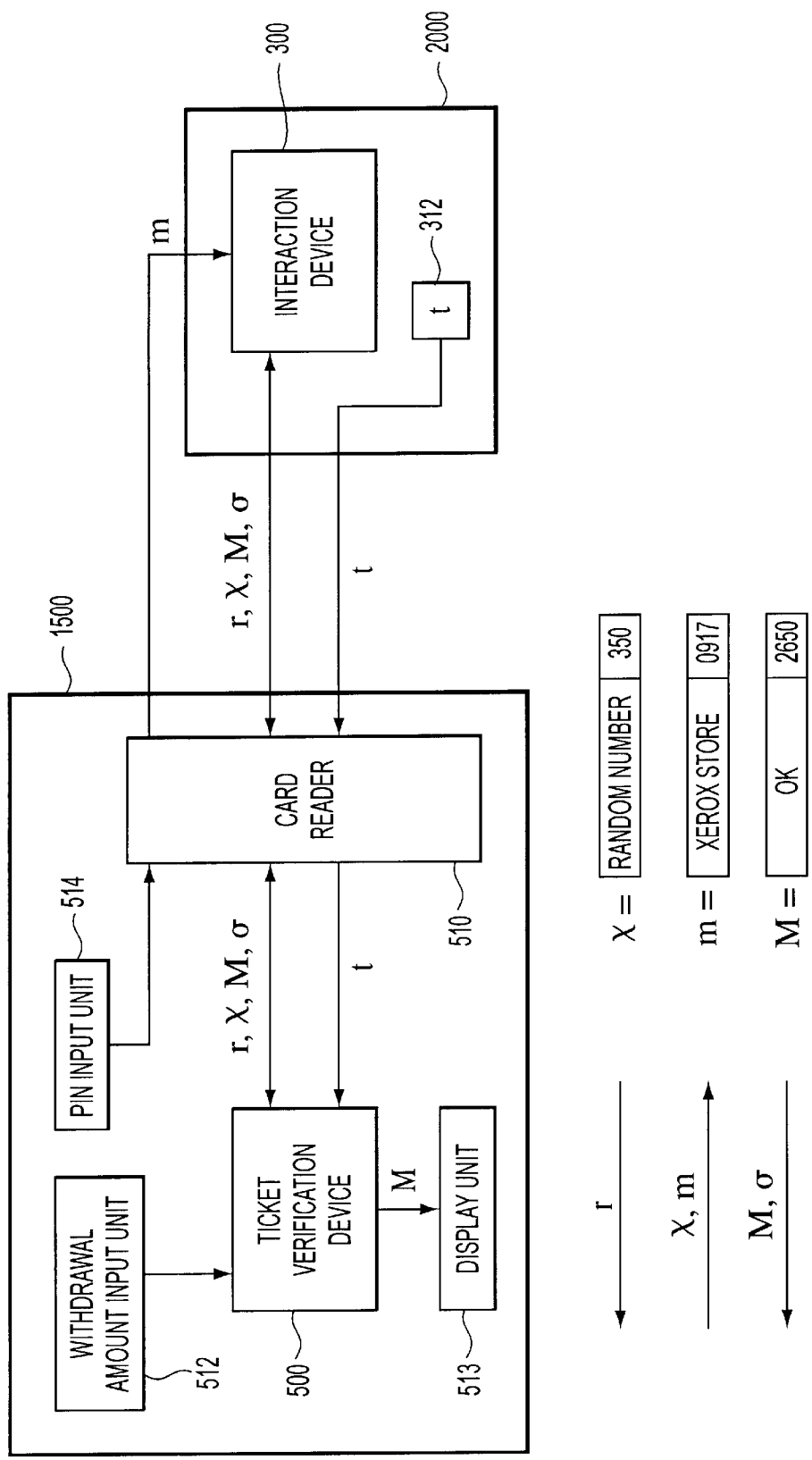
FIG. 13 shows the configuration of an application example.

Next, an example of application to prepaid cards will be described referring to FIG. 13.

In this application example, authentication characteristic information x is made to correspond with service, a ticket is a prepaid card used for the service, and a message transferred during proving contains information about success or failure of withdrawal from the prepaid card and balance information of the prepaid card.

A ticket issuer is a service provider and a prepaid card handling device 1500 is composed of:
(1) smart card reader 510
(2) withdrawal amount input unit 512
(3) display unit 513
(4) PIN input unit 514
(5) ticket verification device 500 implemented as a program burnt into a ROM within the smart card reader.

The smart card reader 510 has a slot for inserting a smart card 2000 to communicate with the smart card 2000.

The withdrawal amount input unit 512, comprised of e.g. ten-keys, is used to input a withdrawal amount.

The display unit 513 displays a withdrawal amount input in the withdrawal amount input unit 512, then if ticket authentication succeeds, displays a transferred message, that is, information about success or failure of withdrawal and a balance of the prepaid card; otherwise, it gives an error indication.

The PIN input unit 514, composed of e.g. ten-keys, is used for PIN input by users.

Assume that a service user owns a smart card 2000 composed of the ticket memory unit 312 and the interaction device 300.

The service user, when purchasing a prepaid card, presents the identifier of his interaction device 300, PIN to be associated with the prepaid card, and a face value of the prepaid card to have a ticket corresponding to the interaction device 300 issued, and inputs it to e.g. his own smart card 2000 and sets the face value information of the prepaid card in a counter of the interaction device 300.

A document composed of a field to represent a service name (e.g., "Xerox Store") and a field to represent PIN (e.g., "0917").

When using the service, the user inserts the smart card 2000 into the prepaid card handling device 1500 to perform ticket authentication.

The smart card reader 510 obtains the ticket stored in the smart card 2000, sets it in the ticket verification device 500, and starts interaction.

A withdrawal amount (e.g., 350 yen) input in the withdrawal amount input unit 512 is embedded in a specific bit field of a challenge sent from the ticket verification device 500, and a service name (e.g., "Xerox Store") and PIN (e.g., "0917") input from the PIN input unit 514 together are input to the interaction device 300 as a document.

The message generation unit 309 (FIG. 3) of the interaction device 300, if a withdrawal amount embedded in the challenge is not greater than a counter value (e.g., 2000 yen), decrements the counter value by the withdrawal amount (that is, 1650 yen) and generates a withdrawal success indication ("OK") and a counter balance (1650 yen) as a message. If the withdrawal amount is greater than the counter value, the message generation unit 309, without decrementing the counter, generates a withdrawal failure indication ("NG") and a counter balance as a message.

The ticket verification device 500 verifies a sent message, and in the case of withdrawal failure, for example, withdraws only a card balance from the card to have the user pay a differential amount in cash.

As described hereinbefore, the. present invention can distribute proof functions based on authentication characteristic information without disclosing the authentication characteristic information in public key cryptography. Hence, it has become possible for a plurality of individuals having no interest with each other to safely perform proving based on identical authentication characteristic information. This has been heretofore impossible. This fact makes it possible to associate a ticket not necessarily belonging to individuals in nature with authentication characteristic information in public key cryptography without modification and the verification side of the ticket can perform authentication simply by determining whether the ticket is true or false according to a disclosed procedure based on disclosed unique verification information, so that the burden on the verification side can be remarkably reduced. Also on the part of the user to prove the holding of the ticket, the above-described characteristic of the verification side is advantageous in that the fairness of the verification side can be confirmed and individuals are not located (because authentication characteristic information not belonging to individuals participates in verification) to verify the ticket. Moreover, to the user, a ticket and an interaction device are black boxes understandable only to a ticket issuer, and if the ticket is input to the interaction device, it cannot be assured that a covert channel not concerned in implementing the authentication method does not exist, whereas, in the present invention, information transfer to the interaction device is implemented as a document which permits the user full interpretation but will not impair the safety of the protection side, and a ticket as a black box is not input to an interaction device as a black box.

The present invention employs Guillou-Quisquater authentication as base public key cryptography. The Guillou-Quisquater authentication is proved by Guillou and Quisquater as to zero knowledgability by "A 'paradoxical' identify-based signature scheme resulting from zero-knowledge", Advances in Cryptology CRYPT '88 (Lecture Notes in Computer Science v. 403), S. Goldwasser (ed.), Springer-Verlag, pp. 216–231 by Guillou and Quisquater.

What is claimed is:

1. An authentication method by which a commitment r is generated, a response s and a message M are generated for a document m and a challenge $\chi$, and an authentication is performed based on verification information $I \in G$, the commitment r and the response s, G is a finite Abelian group whose annihilator is difficult to point of computational complexity to obtain, R is a space of commitments, $\pi$ is a mapping from G to R, C is a space of challenges, and S is a space of messages, the authentication method comprising:

(a) generating a p-element field $F_p$ where p is a prime number;

(b) generating a mapping $\phi$ from a set-theoretic product $C \times S$ of C and S into the p-element field $F_p$;

(c) generating nonreproducible private information $k \in G$ at random;

(d) computing the commitment $r = \pi(k^P)$;

(e) computing document private information $\mu = f(m)$ with f as a private G-valued function;

(f) generating the message M;

(g) computing an exponent $C = \phi(\chi, M)$;

(h) computing a response $\sigma = k \mu^C$;

(i) computing the response $s = t^C \sigma$; and (j) verifying that the generated response s satisfies $r = \pi (s^P I^C)$.

2. An authentication device that generates a commitment r, generates a response s and a message M for a document m and a challenge $\chi$, and performs an authentication based on verification information $I \in G$, the commitment r, and the response s, G is a finite Abelian group whose annihilator is difficult to point of computational complexity to obtain, R is a space of commitments, $\pi$ is a mapping from G to R, C is a space of challenges, and S is a space of messages, the authentication device comprising:

(a) a part that generates a p-element field $F_p$ where p is a prime number;

(b) a part that generates a mapping $\phi$ from a set-theoretic product $C \times S$ of C and S into the p-element field $F_p$;

(c) a part that generates nonreproducible private information $k \in G$ at random;

(d) a part that computes the commitment $r = \pi(k^P)$;

(e) a part that computes document private information $\mu = f(m)$ with f as a private G-valued function;

(f) a part that generates the message M;

(g) a part that computes an exponent $C=\phi(\chi,M)$;

(h) a part that computes a response $\sigma=k\mu^C$;

(i) a part that computes the response $s=t^C\sigma$; and (j) a part that verifies that the generated response s satisfies $r=\pi(s^P I^C)$.

3. An interaction method by which a commitment r is generated, a response $\sigma$ and a message M are generated for a document m and a challenge $\chi$, $F_p$ is a p-element field where p is a prime number, G is a finite Abelian group whose annihilator is difficult to point of computational complexity to obtain, R is a space of commitments, $\pi$ is a mapping from G to R, C is a space of challenges, and S is a space of messages, the interaction method comprising:

(a) generating a p-element field $F_p$ where p is a prime number;

(b) generating a mapping $\phi$ from a set-theoretic product C×S of C and S into the p-element field $F_p$;

(c) generating nonreproducible private information k∈G at random;

(d) computing the commitment $r=\pi(k^P)$;

(e) computing document private information $\mu=f(m)$ with f as a private G-valued function;

(f) generating the message M;

(g) computing an exponent $C=\phi(\chi,M)$; and (h) computing a response $\sigma=k\mu^C$.

4. The interaction method according to claim 3, wherein p=2.

5. The interaction method according to claim 3, wherein p is prime to a generator $\lambda$ of the annihilator of G.

6. The interaction method according to claim 3, wherein G is a multiplicative group (Z/nZ)* of a residue class ring of a rational integers, modulo a composite number n.

7. The interaction method according to claim 3, wherein G is a group E (Z/nZ) comprising points each having a value in Z/nZ of a group scheme E on the residue class ring Z/nZ of rational integers, modulo a composite number n.

8. The interaction method according to claim 3, wherein $\pi$ is an identity mapping.

9. The interaction method according to claim 3, wherein $\pi$ is computed using a hash function.

10. The interaction method according to claim 3, wherein $\phi$ is computed using a hash function.

11. The interaction method for a device that conducts the interaction set forth in claim 3, wherein to output the commitment r, input the document m and the challenge $\chi$, and output the response $\sigma$ and the message M, the interaction device comprises:

(a) a part that inputs and outputs information;

(b) a part that stores information;

(c) a part that generates random numbers;

(d) a part that executes an algorithm in G;

(e) a part that computes $\pi$ if necessary;

(f) a part that computes a specific private function f;

(g) a part that generates messages; and (h) a part that computes $\phi$.

12. The interaction device according to claim 11, wherein internal execution processing processes are difficult to observe from outside the interaction device.

13. The interaction device according to claim 11, wherein said interaction device is configured as a portable compact computation device such as an IC card.

14. The interaction device according to claim 11, wherein the part that computes a specific private function f comprises:

(a) a part that holds specific private information d; and (b) a part that computes a hash function h, wherein document private information $\mu$ is computed using a hash function h from specific private information d and document m.

15. The interaction device according to claim 11, further comprising a part that performs processing according to document m.

16. The interaction device according to claim 15, wherein document m defines at least part of G, p, and $\pi$.

17. The interaction device according to claim 15, wherein document m defines conditions for generating response.

18. The interaction device according to claim 15, wherein document m defines messages to be generated.

19. A ticket issuance method by which ticket t∈G is generated for document m and an interaction device having a specific private function f set forth in claim 11 when authentication characteristic information x∈G corresponding to verification information I∈G satisfies $Ix^P=1$, said ticket issuance method comprising the steps of:

(a) computing document private information $\mu=f(m)$; and (b) computing ticket $t=x\mu^{-1}$.

20. The ticket issuance method according to claim 19, wherein document m depends on authentication characteristic information x.

21. The ticket issuance method according to claim 19, wherein document m contains information for identifying authentication characteristic information x.

22. The ticket issuance device according to claim 19, wherein, to input authentication characteristic information x, document m, and information for identifying an interaction device to output ticket t, said ticket issuance device comprises:

(a) a part that inputs and outputs information;

(b) a part that stores information;

(c) a part that computes specific private information f; and (d) a part that executes an algorithm in G.

23. A ticket synthesis method by which synthesized ticket t corresponding to synthesized verification information $I=I_1 \ldots I_N$ is generated as $t=t_1 \ldots t_N$, where $I_1, t_1, \ldots, I_N, t_N$ are verification information $I_i \in G$ set forth in claim 19 and ticket $t_i \in G$ corresponding to an interaction device having a specific private function f.

24. The interaction device according to claim 11, wherein document private information $\mu=f(m_1) \ldots f(m_N)$ is computed for a plurality of documents $m_1, \ldots, m_N$.

25. A proof method by which the commitment r is generated using an interaction device according to claim 19 and the ticket t and the document m for verification information I and the message M and the response s are generated for the challenge $\chi$ so that they satisfy $r=\pi(s^P I^{\phi(\chi,M)})$, the proof method comprising:

(a) obtaining commitment r using the interaction device;

(b) obtaining the message M and the response $\sigma$ corresponding to the document m and the challenge $\chi$ using the interaction device;

(c) computing the exponent $C=\phi(\chi,M)$; and (d) computing the response $s=t^C\sigma$.

26. A proving device that holds the ticket t and the document m, outputs the commitment r by communicating with the interaction device in claim 25, inputs the challenge $\chi$, and outputs the message M and the response s, the proving device comprising:

(a) a part that inputs and outputs information;

(b) a part that stores information;

(c) a part that executes an algorithm in G; and (d) a part that computes $\phi$.

27. A method for verifying the ticket t for verification information I in claim 19, comprising:
- (a) obtaining the commitment r;
- (b) generating the challenge $\chi$ randomly;
- (c) obtaining the message M and the response $\sigma$;
- (d) computing an exponent $C=\phi(\chi,M)$; and
- (e) confirming that a relational expression $r=\pi((t^C\sigma)^p I^C)$ or a relational expression equivalent to this relational expression is satisfied.

28. A ticket verification device that executes verification in claim 27, wherein, to hold the verification information I and the ticket t, input the commitment r, output the challenge $\chi$, input the message M and the response $\sigma$, and verify legitimacy, the ticket verification device comprises:
- (a) a part that inputs and outputs information;
- (b) a part that stores information;
- (c) a part that generates random numbers;
- (d) a part that executes an algorithm in G;
- (e) a part that computes $\pi$ if necessary; and
- (f) a part that computes $\phi$.

* * * * *